Figure 2:
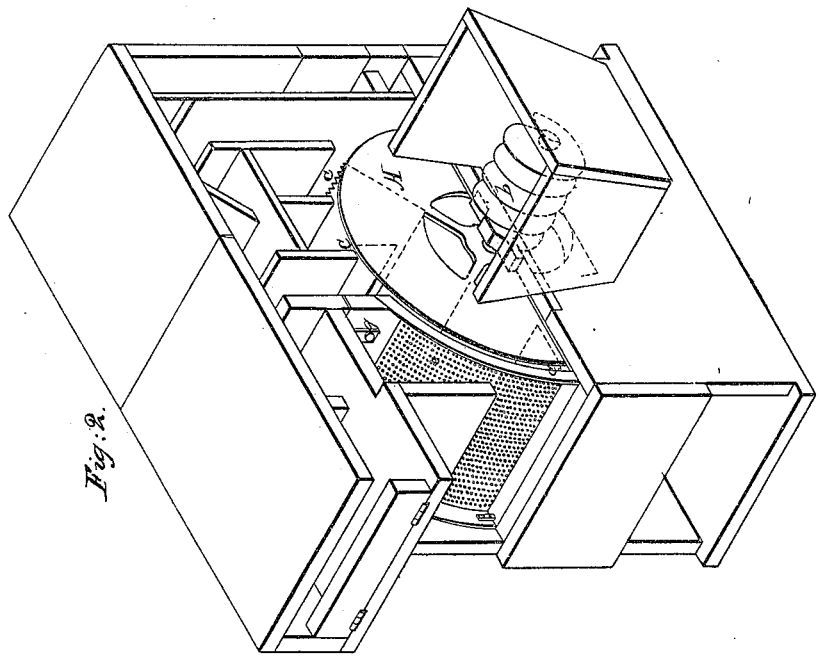
Figure 1:
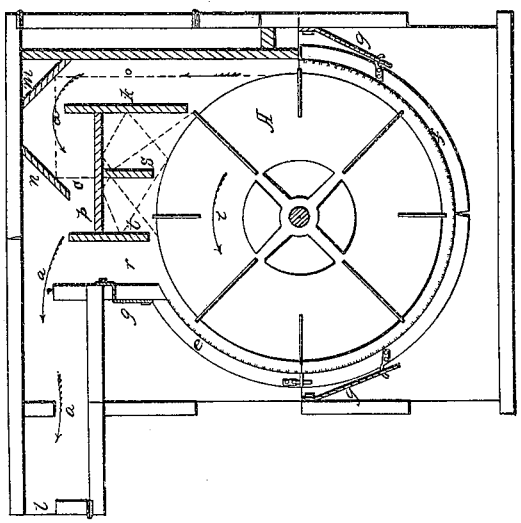

J. R. Peters, Jr.
Wool Picker.

Nº 9,059.  Patented Jun. 22, 1852.

UNITED STATES PATENT OFFICE.

JOHN R. PETERS, JR., OF NEW YORK, N. Y.

MACHINE FOR PREPARING FLOCKS.

Specification of Letters Patent No. 9,059, dated June 22, 1852.

*To all whom it may concern:*

Be it known that I, JOHN R. PETERS, Jr., of the city, county, and State of New York, am the inventor of certain new and useful Improvements in Flock-Machines; and I do hereby declare that the following is a full, clear, and exact description of the same, reference being made to the annexed drawings, making a part of this specification, in which—

Figure I is a vertical longitudinal section; Fig. II is an isometrical view of the interior, and similar letters refer to similar parts throughout.

My invention consists of an improved machine for separating "flock" and at the same time screening out the stones, dirt, sticks, &c., which are intermixed more or less in said flocks as found in the market.

My machine is intended for operating on such "flocks" as have been packed in bales or otherwise, and the necessity for separating these flocks before they are fit for use arises from their being compacted together in large hard masses by reason of the grease used in the manufacture of the cloths. The nails, sticks, dirt, &c., are from the sweepings of the factory. To break up and completely subdivide such fine particles is a matter of considerable difficulty, and I am aware that several machines have been proposed for effecting this purpose. One of the difficulties to be overcome is that which arises from the presence of stones and sticks, viz: to effect the discharge of such from the machine without injury to those finer parts constructed for the minute separation of the flocks. In my machine these difficulties are all overcome by the employment of centrifugal action, the interposition of reflectors and receptacles for the arresting and detention of the dirt between the places of entrance and delivery, and the introduction of elasticity in those finer parts which are liable to derangement by the passage of sticks or like substances. My machine cannot therefore be choked up by the lodgment of such matters in any part, nor injured by their coming in contact with the graters and more delicate parts.

The machine consists of an oblong box in which there are a series of reflectors arranged above a peculiarly constructed fan wheel, said reflectors being set at such angles to the direction of the currents of air issuing from the fan as to interpose barriers to the direct passage of "flocks" to the mouth or discharge place of the machine. By this means the column of air projected from the fan is made to take a curved or serpentine course, as may be seen by the arrows (*a*). The flocks arriving at this place, which have been completely broken up, are so light as to be readily carried by the column of air and discharged at the mouth, but all heavier substances, as stones, &c., having acquired momentum continue on in the direction in which they were projected, and striking some one of the reflectors before mentioned, and to be more fully described, are projected in some other direction and lodged in receptacles prepared to receive them.

At A is a fan blower so constructed as to perform several offices, viz: the feeding, separating, and discharging of the flocks. To effect the feeding there is combined with its shaft a conveyer (*b*) situated within a hopper, as shown in Fig II. The conveyer brings up the flocks, &c., to the edge of the hole in the side of the box, whence they are drawn in by the force of the current produced by the blower in a manner well known. To effect the separating of the flocks the edges of the fans comprising the blower are armed with teeth, seen at (*c*), or other like devices, which are intended to work in combination with the concave sides of a cylindrical grater, which grater embraces from one half to three quarters of the circumference of the fan, and finally the discharge is effected by the centrifugal force generated by the fan, to be more fully described. The grater is seen at (*e, f*). It is a sheet of metal perforated with holes, the bur made by punchings forming the roughened surface, to grind the flocks upon in connection with the edges of the fan; or a bed formed of ribs or other analogous devices may be used instead. In order that the subdivision of the flocks shall be complete the edges of the fan must sweep close to the surface of said grater. It is at this part of the construction that the elasticity before named is employed, and that is in the manner of hanging the graters, for were those rigid they or the fan, or both, would be liable to injury by the jamming in of stones and sticks, but by the introduction of springs in suspending the graters to the box those will yield and permit the solid matters to go through without damaging any parts. The springs referred to are seen at (g) and may be of any suitable elastic or springy material. Above the top of the fan the box is divided into a series of compartments, formed partly by the reflectors and partly by the sides of the box. These reflectors stand at different angles to the circumference of the fan and their operation is such as to interrupt the passage of stones, sticks, &c., and prevent their discharge from the machine along with the flocks. The operation of this part of my machine is based upon the known law that a body projected into space by centrifugal force follows a straight line tangent to the circumference of the machine by which that force was generated. In my machine the fan wheel generates the force, and all matters set in motion by it are projected in lines tangent to its circumference. In operating upon flocks they are fed in at the center by means of the conveyer (b) and the draft created by the blast. Here they are whirled around and being sent to the circumference are brought in contact with the cylindrical grater and the serrated edges (c) of the fan. This reduces the lumps and effects a complete subdivision of all the particles of flocks, which being carried forward in the direction of the arrow (i) and discharged at the end of the grater upward through the channel (k) (which it will be seen is placed in a line tangent to the circumference of the fan), following thence the course of the air, as shown by the arrows (a), are finally discharged at (l) into some proper receptacle.

Now as to the separation of stones, sticks, &c. These are fed in along with the flocks at the center, and being whirled around with those are projected up the channel (k) also. Their gravity being greater than that of the flocks they are not bent out of their course by the change in the direction of the currents of air but pass on and being arrested by striking against some one of the reflectors, a new direction is given to them, by reason of the angular positions of said reflectors. The first reflector is seen at (m). It is at the top of the passage (k), and as the angle of reflection is equal to the angle of incidence a heavy body striking (m) will be thrown horizontally forward. Another reflector (n) is here interposed, set at an inclination contrary to that of (m), so that the heavy body striking it is cast downward, as clearly shown by tracing the course of such a body represented by the dotted line (o). Beneath the reflector (n) a box (p) is formed to receive all such substances. In case of the projection of stones, &c., from the fan at any other part of the opening beyond (k), there are other reflectors placed to intercept the passage of such toward the entrance to the grater (e), as seen at s and t. These reflectors cause all such matters to fall back again into the fan, which carries them around until projected out through (k), as before described. Should any lumps of flock which have been but partially separated be thrown up the channel (k) they will fall into the box (p) in the manner described as for the solid matters, but being much lighter than those will be so fan acted on by the current of air that they will be carried over the front edge of the box (p) and will fall again into the fan through the space (r).

What I claim as of my own invention and desire to secure by Letters Patent is—

1. The construction and arrangement of the fan wheel and its combination with the elastic grinding bed or grater constructed as described or in any other manner substantially the same, for effecting the feeding, separating and discharging of the flocks and other matters mixed therewith, in the manner described.

2. I claim supporting or attaching the concave grater or grinding bed to the frame by springs or other elastic material for the purpose set forth.

3. I claim the reflectors and their arrangement in the machine in the manner and for the purpose set forth, the whole being combined and operating substantially as described herein.

JOHN R. PETERS, Jr.

Witnesses:
J. P. PIRSSON,
S. H. MAYNARD.